United States Patent [19]
Breton et al.

[11] Patent Number: 6,071,333
[45] Date of Patent: Jun. 6, 2000

[54] INK COMPOSITIONS

[75] Inventors: Marcel P. Breton; Shadi L. Malhotra; Raymond W. Wong, all of Mississauga, Canada

[73] Assignee: Xerox Corporation, Stamford, Conn.

[21] Appl. No.: 09/300,333

[22] Filed: Apr. 27, 1999

[51] Int. Cl.$^7$ .................................................. C09D 11/00
[52] U.S. Cl. ..................... 106/31.43; 106/31.57; 106/31.29; 106/31.61
[58] Field of Search ................... 106/31.29, 31.61, 106/31.43, 31.57, 31.58, 31.86

[56] References Cited

U.S. PATENT DOCUMENTS

| | | | |
|---|---|---|---|
| 4,490,731 | 12/1984 | Vaught | 346/140 R |
| 4,751,528 | 6/1988 | Spehrley, Jr. et al. | 346/140 R |
| 4,791,439 | 12/1988 | Guiles | 346/140 R |
| 4,840,674 | 6/1989 | Schwarz | 106/22 |
| 4,853,036 | 8/1989 | Koike et al. | 106/20 |
| 5,006,170 | 4/1991 | Schwarz et al. | 106/20 |
| 5,041,161 | 8/1991 | Cooke et al. | 106/22 |
| 5,098,477 | 3/1992 | Vieira et al. | 106/31.58 |
| 5,111,220 | 5/1992 | Hadimioglu et al. | 346/140 R |
| 5,121,141 | 6/1992 | Hadimoglu et al. | 346/140 R |
| 5,122,187 | 6/1992 | Schwarz et al. | 106/25 |
| 5,124,718 | 6/1992 | Koike et al. | 346/1.1 |
| 5,371,531 | 12/1994 | Rezanka et al. | 347/43 |
| 5,667,568 | 9/1997 | Sacripante et al. | 106/20 R |
| 5,693,126 | 12/1997 | Ito | 106/31.86 |
| 5,698,017 | 12/1997 | Sacripante et al. | 106/31.49 |
| 5,698,128 | 12/1997 | Sakai et al. | 219/745 |
| 5,700,316 | 12/1997 | Pontes et al. | 106/31.58 |
| 5,897,940 | 4/1999 | Malhotra | 428/212 |
| 5,954,866 | 9/1999 | Ohta et al. | 106/31.89 |

*Primary Examiner*—Mark L. Bell
*Assistant Examiner*—Veronica F. Faison
*Attorney, Agent, or Firm*—E. O. Palazzo

[57] ABSTRACT

A ink composition containing (1) a solid carbamate compound; (2) an alcohol compound with a melting point of from about 25° C. to about 90° C.; (3) a lightfastness component; (4) a lightfastness antioxidant; and (5) a colorant.

33 Claims, No Drawings

INK COMPOSITIONS

REFERENCE TO COPENDING PATENT APPLICATIONS

Acoustic inks are illustrated in U.S. Pat. No. 5,931,995, U.S. Pat. No. 5,902,390, U.S. Pat. No. 5,876,492, U.S. Pat. No. 5,922,117, U.S. Pat. No. 5,958,119, and copending applications U.S. Ser. No. 09/281,571, U.S. Ser. No. 09/281,540, U.S. Ser. No. 09/281,682, U.S. Ser. No. 09/300,331, U.S. Ser. No. 09/300,298, U.S. Ser. No. 09/300,193, U.S. Ser. No. 09/300,373, U.S. Ser. No. 09/300,210, and U.S. Ser. No. 09/300,332, the disclosures of each being totally incorporated herein by reference.

The appropriate components and processes of the above copending applications may be selected for the present invention in embodiments thereof.

BACKGROUND OF THE INVENTION

The present invention is directed to ink compositions and, more specifically, the present invention relates to inks with a melting point of between about 60° C. and about 150° C., and preferably between about 70 to about 90° C., and which inks are especially useful for acoustic ink printing, processes and apparatuses, reference, for example, U.S. Pat. No. 5,121,141, U.S. Pat. No. 5,111,220, U.S. Pat. No. 5,371,531, the disclosures of which are totally incorporated herein by reference, including especially acoustic ink processes as illustrated in the above recited copending applications, such as an acoustic ink printer for printing images on a record medium.

The inks of the present invention in embodiments thereof can be referred to as a phase change ink, that is, for example, an ink that changes from a liquid state to solid state in a suitable period of time, for example, from about 1 to about 100 milliseconds and preferably less than about 10, such as from about 2 to about 7 milliseconds, (from about to about includes at least all the values and numbers therebetween) and which ink is comprised of a nonaqueous phase-change color spreading compound, or an additive that can preferably fill the pores of a substrate, such as paper, and which compound has a melting point of lower than about 120° C. and preferably between about 60° C. to about 100° C., and with, for example, a low acoustic loss value of below about 100 dB/mm; (2) a nonaqueous gloss and crease improving alcohol compound with, for example, a boiling point of higher than about 150° C. (Centigrade) and more specifically with a boiling point of from about 150° C. to about 225° C., and preferably from about 170° C. to about 20° C., and a melting point of, for example, between about 25° C. to about 90° C. preferably with a low acoustic loss, which enables a reduction, or minimization of energy consumption, and which acoustic loss is in the range, for example, from about 5 to 60 dB/mm, and preferably between about 5 to about 40 dB/mm; (3) a lightfastness component, such as a UV absorber; (4) a lightfast antioxidant; (5) and a colorant such as a dye, a pigment or mixtures thereof.

More specifically, the present invention is directed to phase-change acoustic ink compositions comprised of (1) nonaqueous solid phase-change compounds with a melting point of lower than about 120° C. and preferably between about 60° C. and about 100° C., and with a low acoustic loss and which acoustic loss is below about 100 dB/mm, and preferably is in the range of between about 25 to about 80 dB/mm at the jetting temperature; (2) a nonaqueous gloss and crease improving alcohol compound having a boiling point of higher than about 150° C. (Centigrade) and more specifically having a boiling point of from about 150° C. to about 225° C. and preferably from about 170° C. to about 20° C., and a melting point of less than 90° C. with low acoustic loss, which enables a reduction, or minimization of energy consumption, and which acoustic loss is in the range of from about 5 to 60 dB/mm, and preferably between 5 to 40 dB/mm; (3) a lightfastness UV absorber; (4) an antioxidant; (5) a colorant, and wherein there can be generated with such inks excellent developed images on plain and coated papers with acceptable image permanence, excellent projection efficiency on transparencies without a post fusing step, and excellent crease resistance, and wherein the inks possess acceptable, and in embodiments, superior lightfastness, for example between about 90 to about 100 percent, and superior waterfastness values of, for example, between about 95 to about 100 percent. Moreover, in embodiments of the present invention there is enabled the elimination, or minimization of undesirable paper curl since water need not be present, or minimum amounts less than about 1 percent, for example, from about 0.5 to about 0.99 of water may be selected in embodiments, and it is preferred that there be an absence of water. When water is not present in the inks, a dryer can be avoided thereby minimizing the cost of the acoustic ink jet apparatus and process.

PRIOR ART

In acoustic ink printing, the print head produces approximately 0.5 to 8 picoliter and preferably about 2.0 picoliter droplets by an acoustic energy process. The ink under these conditions should display a melt viscosity of about 10 centipoise or less at the jetting temperature. Furthermore, once the ink is jetted onto the paper, the ink image should be of excellent crease property, and should be nonsmearing waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can tolerate a temperature up to about 180° C., and preferably up to a temperature of from about 130° C. to about 160° C., the vehicle for the ink should preferably display liquid like properties such as a viscosity of 1 to about 10 centipoise at a temperature of from about 75° C. to about 165° C., and solidify or harden after jetting onto paper such that the ink displays a hardness value of from about 0.1 to about 0.5 millimeter utilizing a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is chosen to have a melting point above room temperature so that the ink, which is melted in the apparatus, will not be subject to evaporation or spillage during periods of nonprinting. The vehicle selected possesses a low critical temperature to permit the use of the solid ink in a thermal ink jet printer. In thermal ink jet printing processes employing phase-change inks, the solid ink is melted by a heater in the printing apparatus and utilized as a liquid in a manner similar to that of conventional thermal or piezoelectric ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Phase-change ink jets are somewhat similar to thermal ink jets; however, a phase-change ink usually contains no solvent. Thus, rather than being liquid at room temperature, a phase-change ink is typically a solid or phase-change having a wax-like consistency. These inks usually need to be heated, for example, to approximately 100° C. before the ink melts and converts into a liquid. With phase-change inks, a plurality of ink jet nozzles is provided in a printhead. A piezoelectric vibrating element is located in each ink channel upstream from a nozzle so that the piezoelectric oscillations propel ink through the nozzle. After the phase-change ink is applied to the substrate, freezing on the substrate resolidifies the ink.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with thermal ink, one needed to use coated papers to obtain photo-like quality images, which are more expensive than plain paper.

One advantage of phase-change ink is its ability to print on plain paper since the phase-change ink quickly solidifies as it cools and, since it is waxy in nature, does not normally soak into a paper medium. However, phase-change ink jet system can be cumbersome in structure and in design, that is, the associated integrated electronics of a thermal ink jet head are considerably more compact than those of a phase-change ink jet head.

U.S. Pat. No. 4,751,528, the disclosure of which is totally incorporated herein by reference, discloses a phase-change ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify phase-change ink in a selected zone more rapidly to avoid offset by a pinch roll coming in contact with the surface of the substrate to which phase-change ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with phase-change inks with an integrally connected ink jet head and reservoir system, the reservoir system including a highly efficient heat conducting plate inserted within an essentially nonheat conducting reservoir housing.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like. The inks of the present invention are dissimilar than the aforementioned '179 and '187 patents, in that, for example, the invention vehicle selected displays acoustic loss values at a viscosity of from about 1 to about 20, and preferably 10 centipoise when heated to a temperature of from about 125° C. to about 165° C., such that acoustic energy in the printhead can eject an ink droplet onto paper.

U.S. Pat. No. 5,041,161, the disclosure of which is totally incorporated herein by reference, discloses ink jet ink, which is phase-change at room temperature. The inks comprise vehicles, such as acids, aldehydes and mixtures thereof, which are phase-change at temperatures between 20° C. and 45° C. The ink is impulse jetted at an elevated temperature in the range of about 45° C. to about 110° C., at which temperature, the ink has a viscosity of about 10 to 15 centipoise. The inks also contain 0.1 to 20 weight percent of a colorant system.

U.S. Pat. No. 4,853,036 and U.S. Pat. No. 5,124,718 disclose an ink for ink jet recording which comprises a liquid composition essentially comprising a coloring matter, a volatile solvent with a vapor pressure of 1 millimeter Hg or more at 25° C., and a compound being solid at room temperature and having a molecular weight of 300 or more.

U.S. Pat. No. 5,667,568 discloses an ink composition comprised of a colorant and a bisamide with a viscosity of from about 1 centipoise to about 20 centipoise at a temperature of from about 125° C. to about 185° C.

U.S. Pat. No. 5,698,017 discloses an ink composition comprised of a colorant and a vehicle component, and which vehicle component is comprised of the condensation product of an organic acid and an amino alcohol.

U.S. Pat. No. 5,698,128 discloses an ink composition comprised of a colorant and a reversible crosslinked component vehicle obtained from the reaction product of an anhydride and an organoamine, and which ink possesses a viscosity of from about 1 centipoise to about 25 centipoise at a temperature of from about 125° C. to about 185° C.

U.S. Pat. No. 5,700,316 discloses an ink composition comprised of a colorant and a vehicle of a poly (alkylene oxide)-alkylate, a poly (alkylene oxide)-dialkylate, a polyoxa-alkanoate ester, or a polyoxaalkanedioate diester, and which ink possesses a viscosity of from about 1 centipoise to about 15 centipoise at a temperature of from about 125° C. to about 165° C.

SUMMARY OF THE INVENTION

While the known ink compositions and processes may be suitable for their intended purposes, a need remains for acoustic phase-change ink compositions suitable for ink jet printing. In addition, there is a need for phase-change ink compositions, which are compatible with a wide variety of plain papers and yield photographic quality images on plain and coated papers. Further, there is a need for phase-change ink compositions, which generate high quality, lightfast, and waterfast images on plain papers. There is also a need for phase-change ink jet ink compositions which generate high quality, fast-drying images on a wide variety of plain papers at low cost with high quality text and high quality graphics, and wherein the dye is retained on the paper surface while the ink vehicle can continue to spread within the paper structure. Further, there is a need for phase-change ink jet ink compositions, which exhibit minimal feathering. Additionally, there is a need for phase-change ink jet ink compositions, which exhibit minimal intercolor bleed. There is also a need for phase-change ink jet ink compositions, which exhibit excellent image permanence. Further, there is a need for phase-change ink jet ink compositions, which are suitable for use in acoustic ink jet printing processes. Additionally, there is a need for phase-change hot ink compositions suitable for ink jet printing processes wherein the substrate is heated prior to printing and is cooled to ambient temperature subsequent to printing (heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. Another need is for phase-change inks wherein the spherulite [spherical ink crystals] size during solidification can be reduced from conventional 6 to 9 micrometers to about 2 to 4 micrometers and in certain situations to about 1 to about 4 micrometers by crystallinity inhibitor diluents, for example from low melting alcohols to improve projection efficiency and crease resistance. The primary advantage of the reduced ink spherulite radius is that when printed on a transparency, an ink with ink spherulite radius of between 8 to 9 micrometers yields images with haze values of between 50 to 60, whereas an ink having ink spherulite radius of between 4 to 6 micrometers, leads to haze values of between about 10 to about 30. These and other needs can be achievable with the inks of the present invention in embodiments thereof.

DETAILED DESCRIPTION OF THE INVENTION

Aspects of the present invention relate to an ink composition, preferably a nonaqueous ink, comprised of (1) a solid carbamate compound; (2) an alcohol compound with a melting point of from about 25° C. to about 90° C.; (3) a lightfastness component; (4) a lightfastness antioxidant; and (5) a colorant; an ink wherein (1) the solid carbamate possesses a melting point of from about 60° C. to about 120° C. and an acoustic-loss value of from about 25 to about 80 dB/mm, and (2) the alcohol compound possesses an acoustic-loss value of from about 5 to about 40 dB/mm; an ink and which ink generates images with crease values of from about 10 to about 20, haze values of from about 10 to about 25, gloss values of from about 80 to about 85, and which ink possesses an acoustic-loss value of from about 10 to about 80 dB/mm, and a viscosity of from about 1 centipoise to about 10 centipoise at a temperature of from about 125° C. to about 165° C.; an ink composition wherein the carbamate is present in an amount of from about 1 to about 98 percent by weight, the alcohol is present in an amount of from about 69 to about 1 percent by weight (throughout the range numbers recited are examples of ranges), the lightfastness component is present in an amount of from about 5 to about 0.25 percent by weight, the antioxidant is present in an amount of from about 5 to about 0.25 percent by weight, and the colorant is present in an amount of from about 20 to about 0.5 percent by weight, and wherein the total of all ink components is about 100 percent; an ink composition wherein the carbamate compound which possesses a melting point of from about 60° C. to about 120° C. is present in an amount of from about 1 to about 98 percent by weight and is selected from the group consisting of (1) tert-butyl carbamate; (2) tert-butyl-N-(tert-butoxycarbonyloxy) carbamate; (3) tert-butyl-N-[2-hydroxy-2-(hydroxyphenyl)-1-methylethyl] carbamate; (4) tert-butyl-(2,4-dinitrophenoxy) carbamate; (5) benzyl carbamate; (6) benzyl N-hydroxycarbamate; (7) ethyldiphenyl carbamate; (8) 2-chloroethyl carbamate; (9) cyanomethyl-N,N-dimethyl dithiocarbamate; (10) 4,4'-methylene-bis (dibutyldithio carbamate); (11) potassium N-hydroxy methyl-N-methyl-dithiocarbamate; (12) sodium dimethyl dithiocarbamate; (13) disodium ethylenebis-dithio carbamate; (14) diethylammonium diethyldithio carbamate; (15) benzyl(S)-(–)-tetrahydro-5-oxo-3-furanyl carbamate; (16) diethyidithiocarbamic acid, ammonium salt; (17) diethyidithiocarbamic acid, diethyl ammonium salt; (18) diethyidithiocarbamic acid, sodium salt, trihydrate; and (19) 4-bromo-3,5-dimethylphenyl N-methylcarbamate; an ink composition wherein the carbamate is selected from the group consisting of (1) tert-butyl carbamate; (2) tert-butyl-(2,4-dinitrophenoxy) carbamate; (3) benzyl carbamate; (4) benzyl N-hydroxycarbamate; and (5) benzyl (S)-(–)-tetrahydro-5-oxo-3-furanyl carbamate; an ink composition wherein alcohol is a cyclic alcohol selected from the group consisting of (1) cycloalkyl alcohols; (2) 4-tert-butyl cyclohexanol; (3) 3-aminomethyl-3,5,5-trimethyl cyclohexanol; (4) 2,2,6,6-tetrachloro cyclohexanol; (5) cycloalkane methanol; (6) dicyclohexylmethanol; (7) 3-cyclohexyl-1-propanol; (8) 2-amino-3-cyclohexyl-1-propanol; (9) (S)-2-(tert-butoxy carbonylamino)-3-cyclohexyl-1-propanol; (10) cycloalkane diol; (11) cis-3,5-cyclohexa diene-1,2-diol; (12) p-menthane-3,8-diol; (13) cyclohexane dimethanol; (14) 3-cyclohexene-1,1-dimethanol; (15) 1,3-dioxane-5,5-dimethanol; and (16) piperidinemethanol; an ink composition wherein the alcohol is a linear alcohol selected from the group consisting of (1) alkyl alcohols, where the number of carbons in the alkyl chain vary from about 6 to about 22; and (2) alkane diols where the number of carbons in the alkane chain vary from about 5 to about 14; an ink composition wherein the alcohol is (3) di(trimethylol propane); (4) nitromethane trispropanol; (5) 11-bromo-1-undecanol; (6) 12-bromo-1-dodecanol; (7) 2-methyl-2-propyl-1,3-propane diol; (8) 2,2-diethyl-1,3-propanediol; (9) (2-(hydroxymethyl)-1,3-propanediol; (10) 2,2,4-trimethyl-1,3-pentanediol; (11) 2-butyne-1,4-diol; (12) (±)-3,6-dimethyl-4-octyne-3,6-diol; (13) 3,6-dithia-1,8-octanediol; or (14) 2,4,7,9-tetramethyl-5-decyne-4,7-diol; an ink composition wherein the alcohol is amino alcohol selected from the group consisting of (1) 2-(2-aminoethoxy)ethanol; (2) 2-(2-amino ethylamino) ethanol; (3) amino-1-propanol; (4) 2-amino-1-butanol; (5) 4-amino-1-butanol; (6) 2-amino-3-methyl-1-butanol; (7) 5-amino-1-pentanol; (8) 6-amino-1-hexanol; (9) DL-2-amino-1-hexanol; and (10) (S)-(–)-N-(tert-butoxycarbonyl) leucinol; or an aromatic alcohol; an ink composition wherein the alcohol is selected from the group consisting of benzyl alcohol; (1) alkyl benzyl alcohols where the number of carbon atoms in the alkyl group vary from 0 to about 8; (2) alkoxy and aryloxy benzyl alcohols where the number of carbons in the alkoxy groups vary from about 1 to about 4; (3) alkyl alkyl benzyl alcohols where the number of carbons in the alkyl varies from about 1 to about 4; (4) 2-amino-3-methyl benzyl alcohol; (5) alkoxy alkoxy benzyl alcohols where the number of carbon atoms in the alkoxy group varies from about 1 to about 4; (6) 2-hydroxy-3-methoxy benzyl alcohol; and (7) 3,4,5-trimethoxy benzyl alcohol; an ink composition wherein the alcohol is selected from the group consisting of phenyl alcohol; (1) phenylpropanol; (2) 3-(4-hydroxy phenyl)-1-propanol; (3) (S)-(–)-1-phenyl-1-butanol; (4) 2-amino-1-phenyl ethanol; (5) 3,4-dimethoxy phenethyl alcohol; (6) 2-phenyl-1,2-propane diol; (7) 3-phenoxy-1,2-propane diol; (8) 3-methoxy catechol; (9) benzhydrol; (10) methyl benzhydrol; (11) phenethylalcohol; (12) 4-methoxy phenethyl alcohol; (13) 2-hydroxy phenethyl alcohol; and (14) 2-amino phenethylalcohol; an ink wherein the lightfastness component is a compound selected from the group consisting of (1) 1,1-(1, 2-ethane diyl) bis(3,3,5,5-tetramethyl piperazinone); (2) 6-ethoxy-1,2-dihydro-2,2,4-trimethyl quinoline; (3) 2-(4-benzoyl-3-hydroxyphenoxy)ethyl acrylate; (4) 2-dodecyl-N-(2,2,6,6-tetramethyl-4-piperidinyl)succinimide; and (5) 1,2,2,6,6-pentamethyl-4-piperidinyl/β,β,β',β'-tetramethyl-3, 9-(2,4,8,10-tetraoxo spiro (5,5) undecane)diethyl]-1,2,3,4-butane tetracarboxylate; an ink wherein the lightfastness antioxidant compound is selected from the group consisting of (1) antimony dialkyl phosphorodithioate; (2) molybdenum oxysulfide dithio carbamate; (3) nickel-bis(o-ethyl) (3,5-di-tert-butyl-4-hydroxybenzyl)phosphonate; and (4) tetra sodium N-(1,2-dicarboxyethyl)-N-octadecyl sulfosuccinamate; a printing process which comprises incorporating into an acoustic ink jet printer the inks of the present invention; a process wherein the ink generates images with crease values of between about 10 to about 20, haze values of between about 10 to about 25, gloss values between about 80 to about 85, and which ink possesses an acoustic-loss value of from about 10 to about 80 dB/mm, and a viscosity of from about 1 centipoise to about 10 centipoise at a temperature of from about 125° C. to about 165° C.; a process which comprises providing an acoustic ink printer having a pool of the liquid inks of the present invention with a free surface, and a printhead including at least one droplet ejector for radiating the free surface of the ink with focused acoustic radiation to eject individual droplets of ink therefrom on demand, the radiation being brought to focus with a finite waist diameter in a focal plane, and causing droplets of the ink to be ejected in imagewise pattern onto a substrate; a process wherein the ink generates images with crease values of between about 10 to 25, haze values of between about 10 to about 30, gloss values between about 80 about 95, and which ink possesses an acoustic-loss value of from about 10 to about 80 dB/mm, and a viscosity of from about 1 centipoise to about 15 centipoise at a temperature of from about 125° C. to about 165° C.; an ink wherein the colorant is selected in an amount of from about 0.5 to about 20 percent by weight; an ink wherein the colorant is a pigment, or a dye; an ink wherein the colorant is a pigment of cyan, magenta, yellow, black, or mixtures thereof; an ink composition wherein the carbamate is (1) benzyl (S)-(−)-tetrahydro-5-oxo-3-furanyl carbamate; (3) the lightfastness component is a UV absorber is 2-dodecyl-N-(2,2,6,6-tetramethyl-4-piperidinyl) succinimide, [1,2,2,6,6-pentamethyl-4-piperidinyl/β,β,β',β'-tetramethyl-3,9-(2,4,8, 10-tetraoxo spiro (5,5) undecane)diethyl]-1,2,3,4-butane tetracarboxylate and (4) the lightfastness antioxidant is tetra-sodium-N-(1,2-dicarboxyethyl)-N-octadecyl-sulfosuccinamate), molybdenum oxysulfide dithio carbamate; an ink with a viscosity of from about 1 centipoise to about 10 centipoise and an acoustic loss of from about 10 to about 80 dB/mm; an ink composition comprised of (1) a carbamate; (2) an alcohol; (3) a lightfastness compound; (4) an antioxidant; and (5) a colorant; an ink composition wherein (1) the carbamate is a solid carbamate compound that possesses a melting point of from about 60° C. to about 120° C. and an acoustic-loss value of from about 25 to about 80 dB/mm; (2) the alcohol possesses a melting point of from about 25° C. to about 90° C. with an acoustic-loss value of from about 5 to about 40 dB/mm, and which ink possesses an acoustic-loss value of from about 10 to about 80 dB/mm, and a viscosity of from about 1 centipoise to about 20 centipoise at a temperature of from about 125° C. to about 165° C.; an ink wherein the colorant is a pigment, or a dye; and inks comprised of (1) nonaqueous solid phase-change carbamate with a melting point lower than about 120° C. and preferably between about 60 to about 10° C. or about 50 to about 80° C., with a low acoustic loss value, and which acoustic loss is below about 100 dB/mm, and preferably in the range of between about 25 to about 80 dB/mm; (2) a nonaqueous gloss and crease improving alcohol compound with a boiling point of higher than about 150° C. (Centigrade), and more specifically, with a boiling point from about 150° C. to about 22° C. and preferably from about 170° C. to about 200° C., and a melting point of between about 25° C. to about 90° C., and with a low acoustic loss, which enables a reduction, or minimization of energy consumption, and which acoustic loss is in the range of from about 5 to 60 dB/mm, and preferably between about 5 to 40 dB/mm; (3) a lightfastness UV absorber; (4) an antioxidant; (5) a colorant, and wherein the colorant is present in various suitable amounts.

The solid phase-change carbamate compound with, for example, a melting point of from about 60° C. to about 120° C. is present, for example, in an amount of from about 1 to about 98 percent by weight, the gloss and crease improving alcohol compound with an acoustic-loss value of from about 5 to about 40 dB/mm is present in an amount of, for example, from about 69 to about 1 percent by weight, the lightfastness component is present, for example, in an amount of from about 5 to about 0.25 percent by weight, the antioxidant is, for example, present in an amount of from about 5 to about 0.25 percent by weight, and the colorant is, for example, present in an amount of from about 20 to about 0.5 percent by weight, and wherein the total of all ink components is about 100 percent.

The ink composition contains, for example, the following range amounts (1) solid carbamate; (2) alcohol; (3) lightfastness component; (4) lightfastness antioxidant; and (5) colorant [1+69+5+5+20=100] to [98+1+0.25+0.25+0.5= 100], with the preferred range amounts being [15+60+5+5+ 15=100] to [90+7+1+1+1=100]. These compsosition were established using a number of known techniques, such as a statistical design based on the analyses of the experimental data of viscosity at 150° C., jettability at 150° C., image quality, lightfast, and waterfast values of images generated with various ink compositions.

In preferred embodiments, the solid carbamate compound with an acoustic-loss value of from about 25 to about 80 dB/mm is present in an amount of from about 15 to about 90 percent by weight, the gloss and crease improving alcohol compound with a melting point of between about 25° C. to about 90° C. is present in an amount of from about 60 to about 7 percent by weight, the lightfastness component is present in an amount of from about 5 to about 1 percent by weight, the antioxidant is present in an amount of from about 5 to about 1 percent by weight, and the colorant is present in an amount of from about 15 to about 1 percent by weight. Examples of solid phase-change compounds with melting points of, for example, between about 60° C. to about of 120° C., and preferably an acousti-closs value of, for example, between about 25 to about 80 dB/mm, include (1) tert-butyl carbamate, (Aldrich #16,739-8); (2) tert-butyl-N-(tert-butoxycarbonyloxy) carbamate, (Aldrich #41,279-1); (3) tert-butyl-N-[2-hydroxy-2-(hydroxyphenyl)-1-methylethyl] carbamate, (Aldrich #40,429-2); (4) tert-butyl- (2,4-dinitrophenoxy) carbamate, (Aldrich #33,305-0); (5) benzyl carbamate, (Alfa Organics #A11569); (6) benzyl N-hydroxycarbamate, (Aldrich #32,327-6); (7) ethyldiphenyl carbamate, (Aldrich #37,291-9); (8) 2-chloroethyl carbamate, (Aldrich #40,429-2); (9) cyanomethyl-N,N-dimethyl dithiocarbamate, (Aldrich #28,054-2); (10) 4,4'-methylene-bis(dibutyldithio carbamate), Vanlube 7723, Vanderbilt Corporation; (11) potassium N-hydroxy methyl-N-methyl-dithiocarbamate (Busan 40 from Buckman Laboratories Inc.); (12) sodium dimethyl dithiocarbamate; (13) disodium ethylenebis-dithio carbamate; (14) diethylammonium diethyldithio carbamate, (Alfa Organics.#A10458); (15) benzyl(S)-(–)-tetrahydro-5-oxo-3-furanyl carbamate, (Aldrich #41,924-9); (16) diethyldithiocarbamic acid, ammonium salt, (Aldrich #35,954-8); (17) diethyldithiocarbamic acid, diethyl ammonium salt, (Aldrich #31,811-6); (18) diethyldithiocarbamic acid, sodium salt, trihydrate, (Aldrich #22,868-0); (19) 4-bromo-3,5-dimethylphenyl N-methylcarbamate, (Aldrich #34,694-2); and/or (b) thiourea compounds such as (1) 1-allyl-2-thiourea, (Aldrich #10,880-41); (2) 1-allyl-3-(2-hydroxyethyl)-2-thiourea, (Aldrich #A3,280-2); (3) 1-methyl-2-thiourea, (Aldrich #M8,460-7); (4) 1-methallyl-3-methyl-2-thiourea, (Aldrich #19,046-2); (5) 1,3-dibutyl-2-thiourea, (Aldrich #D4,959-8); (6) 1,1,3,3-tetramethyl-2-thiourea, (Aldrich #11,516-9); (7) N,N'-di-n-propyl thiourea, (Alfa Organics #A17217); (8) 1-benzyl-3-methyl-2-thiourea, (Aldrich #27,550-6).

Alcohol examples are (A) cyclic alcohols, such as (1) cycloalkyl alcohols where the number of carbons in the alkyl chain vary, for example, from 1, preferably from about 6 to about 12 and more preferably from about 8 to about 10, such as cyclohexanol, (Aldrich #10,589-9), cycloheptanol, (Aldrich #C9,880-2), cyclododecanol, (Aldrich #C9,740-7); (2) 4-tert-butyl cyclohexanol, (Aldrich #B9,200-1); (3) 3-aminomethyl-3,5,5-trimethyl cyclohexanol, (Aldrich #19,479-4); (4) 2,2,6,6-tetrachloro cyclohexanol, (Aldrich #18,681-3); (5) cycloalkane methanol where the number of carbons in the alkane chain is for example, from about 5 to about 12 and preferably between about 8 to about 11, such as cyclopentane methanol, (Aldrich #10,398-5), cyclohexane methanol, (Aldrich #C10,580-5), cycloheptane methanol, (Aldrich #13,865-7), cyclododecane methanol, (Aldrich #11,224-0); (6) dicyclohexylmethanol, (Aldrich #31,772-1); (7) 3-cyclohexyl-1-propanol, (Aldrich #30,440-9); (8) 2-amino-3-cyclohexyl-1-propanol, (Aldrich #42,161-8); (9) (S)-2-(tert-butoxycarbonylamino)-3-cyclohexyl-1-propanol, (Aldrich #42,169-3); (10) cycloalkane diol where the number of carbons in the alkane chain is from 5 to about 9 and preferably between about 6 and 8 such as 1,2-cyclopentanediol, (Aldrich #36,144-5), 1,3-cyclohexanediol, (Aldrich #C10,110-9), 1,2-cyclohexane diol, (Aldrich #36,126-7; 14,171-2), 1,4-cyclohexane diol, (Aldrich #C10,120-6), cyclooctanediol, (Aldrich #17,903-5; 36,223-9); (11) cis-3,5-cyclohexadiene-1,2-diol, (Aldrich #36,506-8); (12) ρ-menthane-3,8-diol, (Aldrich #38,404-6; 38,405-4); (13) cyclohexane dimethanol, (Aldrich #12,559-8; Aldrich #18,908-1); (14) 1,3-dioxane-5,5-dimethanol, (Aldrich #22,062-0); (15) 3-cyclohexene-1,1-dimethanol, (Aldrich #16,215-9); (16) piperidine methanol, (Aldrich #15,522-5), (Aldrich #15,523-3); (17) 4,4'-trimethylenebis (1-piperidine ethanol) (Aldrich #12,122-3);

(B) linear alcohols, such as (1) alkyl alcohols where the number of carbons in the alkyl chain is for example, from about 1, preferably from about 6 about 22 and more preferably between about 12 to about 16 such as hexyl alcohol, (Aldrich #H1330-3), heptyl alcohol, (Aldrich #H280-5), octyl alcohol, (Aldrich #29,324-5), nonyl alcohol, (Aldrich #13,121-0), decylalcohol, (Aldrich #23,976-3), undecyl alcohol, (Aldrich #U100-1), 1-dodecanol, (Aldrich #12,679-9), 1-tetra decanol, (Aldrich #18,538-8), 1-pentadecanol, (Aldrich #41,222-8), 1-hexadecanol, (Aldrich #25,874-1), 1-eicosanol, (Aldrich #23,449-4), 1-docosanol, (Aldrich #16,910-2); (2) alkane diols where the number of carbons in the alkane chain is about 5 to about 14 and preferably from about 8 to about 12, such as 1,5-pentane diol, (Aldrich #P770-3), 1,6-hexane diol, (Aldrich #H1,180-7), 1,7-heptane diol, (Aldrich #H220-1), 1,2-octane diol, (Aldrich #21,370-5), 1,8-octane diol, (Aldrich #O,330-3), 1,9-nonane diol, (Aldrich #N2,960-0), 1,10-decane diol, (Aldrich #D,120-3), 1,2-decane diol, (Aldrich #26,032-0), 1,2-dodecane diol, (Aldrich #21,372-1), 1,12-dodecane diol, (Aldrich #D22,130-9), 1,2-tetradecane diol, (Aldrich #26,029-0), 1,14-tetradecane diol, (Aldrich #29,901-4); (3) di(trimethylol propane) (Aldrich #41,613-4); (4) nitromethane trispropanol, (Aldrich #36,153-4); (5) 11-bromo-1-undecanol, (Aldrich #18,413-6); (6) 12-bromo-1-dodecanol, (Aldrich #22,467-7); (7) 2-methyl-2-propyl-1,3-propane diol, (Aldrich #M7,520-9); (8) 2,2-diethyl-1,3-propanediol, (Aldrich #D10,000-5); (9) (2-(hydroxymethyl)-1,3-propanediol, (Aldrich #39,365-7); (10) 2,2,4-trimethyl-1,3-pentanediol, (Aldrich #32,722-0); (11) 2-butyne-1,4-diol, (Aldrich #B10,320-9); (12) (±)-3,6-dimethyl-4-octyne-3,6-diol, (Aldrich #27,840-8); (13) 3,6-dithia-1,8-octanediol, (Aldrich #23,533-4); (14) 2,4,7,9-tetramethyl-5-decyne-4,7-diol, (Aldrich #27,838-6);

(C) amino alcohols such as (1) 2-(2-aminoethoxy)ethanol, (Aldrich #A5,405-9); (2) 2-(2-amino ethylamino) ethanol, (Aldrich #12,758-2); (3) amino-1-propanol, (Aldrich #23,886-4, 29,768-2, 19,217-1, A7,620-6, 23,984-4); (4) 2-amino-1-butanol, (Aldrich #A4,380-6); (5) 4-amino-1-butanol, (Aldrich #17,833-0); (6) 2-amino-3-methyl-1-butanol, (Aldrich #18,483-7); (7) 5-amino-1-pentanol, (Aldrich #12,304-8); (8) 6-amino-1-hexanol, (Aldrich #A5,645-0); (9) DL-2-amino-1-hexanol, (Aldrich #23,767-1); (10) (S)-(–)-N-(tert-butoxycarbonyl) leucinol, (Aldrich #44,119-8);

(D) aromatic alcohols, such as (1) alkyl benzyl alcohol where the number of carbon atoms in the alkyl group is, for example, from 0 to about 8, and preferably between about 4 and 6, such as benzyl alcohol, (Aldrich #10,800-6), 3-methyl benzyl alcohol, (Aldrich #18,821-2), 4-methyl benzyl alcohol, (Aldrich #12,780-9), 2-phenyl benzyl alcohol, (Aldrich #18,882-4), 2-phenethyl benzyl alcohol, (Aldrich #18,478-0); (2) alkoxy and aryloxy benzyl alcohols where the number of carbons in the alkoxy groups is for example, from about 1 to about 4 such as 2-methoxy benzyl alcohol, (Aldrich #M1,080-8), 3-methoxybenzyl alcohol, (Aldrich #M1,100-6), 4-methoxy benzyl alcohol, (Aldrich #13,690-5), 2-ethoxy benzyl alcohol, (Aldrich #19,066-7), 4-ethoxy benzyl alcohol, (Aldrich #19,047-0), 4-butoxy benzyl alcohol, (Aldrich #18,424-1), and in the aryloxy groups these vary from 6 to 8 such as 3-benzyloxy benzyl alcohol; (3) alkyl alkyl benzyl alcohols where the number of carbons in alkyl varies from about 1 to about 4 such as 2,4-dimethyl benzyl alcohol, (Aldrich #18,878-6), 2,5-dimethyl benzyl alcohol, (Aldrich #18,932-4), 3,5-dimethyl benzyl alcohol, (Aldrich #19,999-0), 3,4-dimethyl benzyl alcohol, (Aldrich #18,879-4); (4) 2-amino-3-methyl benzyl alcohol, (Aldrich #33,419-7); (5) alkoxy alkoxy benzyl alcohols where the number of carbon atoms in the alkoxy group varies from about 1 to about 4 such as 2,4-dimethoxy benzyl alcohol, (Aldrich #15,963-8), 3,5-dimethoxy benzyl alcohol, (Aldrich #19,165-5), 2,3-dimethoxy benzyl alcohol, (Aldrich #12,631-4), 3-ethoxy-4-methoxy benzyl alcohol, (Aldrich #30,790-4), 4-ethoxy-3-methoxy benzyl alcohol, (Aldrich #18, 914-6); (6) 2-hydroxy-3-methoxy benzyl alcohol, (Aldrich #30,596-0); (7) 3,4,5-trimethoxy benzyl alcohol, (Aldrich #T7,000-9);

(b) phenyl alcohol derivatives such as (1) phenylpropanol, (Aldrich #P3,080-2, Aldrich #14,085-6); (2) 3-(4-hydroxy phenyl)-1-propanol, (Aldrich #19,741-6); (3) (S)-(-)-1-phenyl-1-butanol, (Aldrich #31,731-4); (4) 2-amino-1-phenyl ethanol, (Aldrich #A7,240-5); (5) 3,4-dimethoxy phenethyl alcohol, (Aldrich #19,765-3); (6) 2-phenyl-1,2-propane diol, (Aldrich #21,376-4); (7) 3-phenoxy-1,2-propane diol, (Aldrich #10, 819-7); (8) 3-methoxy catechol, (Aldrich #M1,320-3); (9) benzhydrol, (Aldrich #B,485-4); (10) methyl benzhydrol, (Aldrich #18,995-2, Aldrich #18,996-0); (11) phenethylalcohol, (Aldrich #P1,362-2); (12) 4-methoxy phenethyl alcohol, (Aldrich #15,418-0); (13) 2-hydroxy phenethyl alcohol, (Aldrich #18,824-7, Aldrich #19,902-8); (14) 2-amino phenethylalcohol, (Aldrich #19,260-0); and the like.

Lightfastness components that primarily protect the developed images from ultraviolet light degradation include (1) N-p-ethoxycarbonylphenyl)-N'-ethyl-N'-phenyl formadine, Givaudan Corporation; (2) 1,1-(1,2-ethane-diyl) bis(3,3,5,5-tetra methyl piperazinone), Goodrich Chemicals; (3) 2,2,4-trimethyl-1,2-hydroquinoline, Mobay Corporation; (4) 6-ethoxy-1,2-dihydro-2,2,4-trimethylquinoline, Monsanto Chemicals; (5) 2,4,6-tris-(N-1,4-dimethylpentyl-4-phenylenediamino)-1,3,5-triazine, Uniroyal Corporation; (6) 2-(4-benzoyl-3-hydroxy phenoxy)ethylacrylate; (7) 2-dodecyl-N-(2,2,6,6-tetramethyl-4-piperidinyl) succinimide; (8) 2-dodecyl-N-(1,2,2,6,6-penta methyl-4-piperidinyl) succinimide; (9) N-(1-acetyl-2,2,6,6-tetramethyl-4-piperidinyl)-2-dodecyl succinimide, all four available from Aldrich Chemicals; (10) 2,2,6,6-tetramethyl-4-piperidinyl/ $\beta,\beta,\beta',\beta'$-tetramethyl-3,9-(2,4,8,10-tetraoxospiro(5,5)-undecane) diethyl]-1,2,3,4-butane tetracarboxylate; (11) [1,2,2,6,6-pentamethyl-4-piperidinyl/$\beta,\beta,\beta',\beta'$-tetramethyl-3,9-(2,4,8,10-tetraoxo-spiro-(5,5)undecane) diethyl]-1,2,3, 4-butane tetracarboxylate; (12) [2,2,6,6-tetra methyl-4-piperidinyl)-1,2,3,4-butane tetracarboxylate, all three available from Fairmount Corporation; (13) nickel dibutyl dithio carbamate, available as UV-Chek AM-105, from Ferro Corporation; and the like.

Examples of lightfast antioxidants, which primarily protect the inks from thermal degradation are (1) antimony dialkyl phosphorodithioate; (2) molybdenum oxysulfide dithio carbamate, both available from Vanderbilt Corporation; (3) (nickel-bis (o-ethyl(3,5-di-tert-butyl-4-hydroxybenzyl) phosphonate, Ciba Geigy Corporation; (4) tetra sodium-N-(1,2-dicarboxyethyl)-N-octadecyl sulfosuccinamate, American Cyanamid Corporation.

Suitable colorants, present in an effective amount generally of from about 1 to about 25 and more specifically from about 2 to about 12 weight percent, include pigments and dyes, with solvent dyes being preferred. Any dye or pigment there may be selected a component that it is capable of being dispersed or dissolved in the vehicle and is compatible with the other ink components. Colorants include pigments, dyes, mixtures thereof, mixtures of dyes, mixtures of pigments, and the like.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871 K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2GO1 (American Hoechst); Irgalite Blue BCA (Ciba-Geigy); Paliogen Blue 6470 (BASF); Sudan III (Red Orange), (Matheson, Colemen Bell); Sudan II (Orange), (Matheson, Colemen Bell); Sudan Orange G (Aldrich); Sudan Orange 220 (BASF); Paliogen Orange 3040 (BASF); Ortho Orange OR 2673 (Paul Uhlich); Paliogen Yellow 152,1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks, such as REGAL 330® (Cabot), Carbon Black 5250, Carbon Black 5750 (Columbia Chemical Company).

Examples of suitable dyes are Pontamine; Food Black 2; Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes, and within the class of solvent dyes, spirit soluble dyes are preferred because of their compatibility with the vehicles and dye leveling agents of the present application. Examples of suitable spirit solvent dyes include Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G, Aizen Spilon Yellow C-GNH (Hodogaya Chemical Company); Sirius Supra Yellow GD 167, Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); and the like. Neozapon Black X51 [C.I. Solvent Black; C.I.#12195] (BASF); Sudan Blue 670 [C.I. #61554] (BASF); Sudan Yellow 146 [C.I. #12700] (BASF); Sudan Red 462 [C.I. #26050] (BASF) are preferred.

The inks of the present invention can be prepared by any suitable method, such as by simple mixing of the components. For example, a colored phase-change ink composition can be prepared by mixing 65 percent by weight of the solid carbamate or thiourea additive having an acoustic-loss value of less than about 60 dB/mm, and a melting point of between about 60 to about 120° C.; 20 percent by weight of the gloss and crease improving alcohol compound having a melting point between about 25 to 90° C.; 5 percent by weight of a lighfast UV absorber; 5 percent by weight of lightfast antioxidant; and 5 percent by weight of a colorant. The mixture resulting can then be heated to a temperature of about 120° C. and stirred for a period of about 60 minutes until it forms a homogeneous solution, and subsequently the solution can be cooled to 25° C.

The inks of the present invention are particularly suitable for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, *IBM Technical Disclosure Bulletin*, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and acontinuous stream ink jet printers have suffered.

The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing; (2) matrix configured ejector arrays for matrix printing; and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however, in other embodiments, the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Acoustic-loss measurements recited herein were measured as follows: the solid ink compounds were placed between the two transducers, with the temperature set at 150° C. Samples, about 5 to 10 grams, were permitted to equilibrate at 150° C. for five minutes. The two transducers were then brought together to maximize the acoustic signal, and the amplitude and the position of the signals were recorded. The two transducers were separated by a distance varying from 25.4 microns to 125.4 microns recording each time the amplitude and the position of the signal. Each measurement was performed three times and three samples of the same ink material solids were measured. The attenuation dB/mm was then calculated by ratioing the amplitude values obtained at different separation distances. The carbamate compounds of the present application had dB/mm values of about 15 to about 40, whereas the solid carbamate compounds had dB/mm values of about 35 to about 65.

The optical density values of, for example, black [Neozapon Black X51 C.I. #12195] between 2.1 to 2.2, cyan [Sudan Blue 670 C.I. #61554] between 1.80 to 1.85, Magenta Sudan Red 462 [C.I. #26050], between 1.95 to 1.98, and yellow [Sudan Yellow 146 C.I. #12700] between 1.37 to 1.45, were obtained on a Pacific Spectrograph Color System. The system consists of two major components; an optical sensor and a data terminal. The optical sensor employs a 6-inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

The lightfastness values of the ink jet images were measured in the Mark V Lightfast Tester obtained from Microscal Company, London, England; and the waterfast values were obtained from the recorded optical density data recorded and after washing with water at 25° C. for five minutes.

The viscosity values were measured at 150° C. with a Stress Rheometer from Cari-Med model CSL 100. All experiments were performed at a shear rate of 1250 s$^{-1}$.

The average width of the creased image due to pressure was obtained on colored and black solid area images printed on paper by (a) folding inwards the printed area of the image; (b) passing on the folded image a standard Teflon coated copper roll 2 inches in width, 3 inches in outer diameter, 2.25 inches in inner diameter and weighing 860 grams; (c) unfolding the paper and wiping the loose toner from the creased imaged surface with a cotton swab; and (d) measuring the average width of the toner free creased area with an image analyzer.

The haze values were measured on images printed on uncoated polyester, such as MYLAR®, with a Haze meter XL-211, HAZEGARD® System obtained from Pacific Scientific Company.

The following Examples are provided. These examples are intended to be illustrative, and the invention is not limited to the materials, conditions, or process parameters set forth in these embodiments. All parts and percentages are by weight unless otherwise indicated.

EXAMPLE I

A black phase-change ink composition was prepared by mixing 65 percent by weight of the solid additive tert-butyl carbamate, (Aldrich #16,739-8) having a melting point of 106° C. and an acoustic-loss value of 40 dB/mm; 20 percent by weight of the gloss and crease improving alcohol compound 3-cyclohexene-1,1-dimethanol, (Aldrich #16,215-9) with an acoustic-loss value of 25 dB/mm and a melting point of 89° C.; 5 percent by weight of the UV absorber 2-dodecyl-N-(2,2,6,6-tetramethyl-4-piperidinyl) succinimide, (Aldrich #41,317-8); 5 percent by weight of the antioxidant tetra sodium-N-(1,2-dicarboxyethyl)-N-octadecyl sulfosuccinamate, AEROSOL 22N, American Cyanamid Corporation; and 5 percent by weight of the colorant Neozapon Black X51 [C.I. Solvent Black; C.I. #12195] (BASF). The mixture resulting was heated to a temperature of about 120° C. and stirred for a period of about 60 minutes until it formed a homogeneous solution, and subsequently the solution was cooled to 25° C. The resulting black had an acoustic loss value of 39 dB/mm and a viscosity of 5.2 cps at 150° C.

EXAMPLE II

A blue phase-change ink composition was prepared by mixing 65 percent by weight of the solid additive benzyl (S)-(−)-tetrahydro-5-oxo-3-furanyl carbamate, (Aldrich #41,924-9) with a melting point of 104° C. and an acoustic-loss value of 38 dB/mm; 20 percent by weight of the gloss and acrease improving alcohol compound dicyclohexylmethanol, (Aldrich #31,772-1 with an acoustic-loss value of 33 dB/mm and a melting point of 62° C.; 5 percent by weight of the UV absorber 2-dodecyl-N-(2,2,6,6-tetramethyl-4-piperidinyl) succinimide, (Aldrich #41,317-8); 5 percent by weight of the antioxidant tetra sodium-N-(1,2-dicarboxyethyl)-N-octadecyl sulfosuccinamate, AEROSOL 22N, American Cyanamid Corporation; and 5 percent by weight of the colorant Sudan Blue 670 [C.I. #61554] (BASF). The mixture was heated to a temperature of about 120° C. and stirred for a period of about 60 minutes until it formed a homogeneous solution, and subsequently the solution was cooled to 25° C. The resulting blue ink had an acoustic loss value of 39 dB/mm and a viscosity of 5.25 cps at 150° C.

EXAMPLE III

A yellow phase-change ink composition was prepared by mixing 65 percent by weight of the solid additive tert-butyl-(2,4-dinitrophenoxy) carbamate, (Aldrich #33,305-0) having a melting point of 79° C. and an acoustic-loss value of 37 dB/mm; 20 percent by weight of the gloss and crease improving alcohol compound 1,2-tetradecane diol, (Aldrich #26,029-0) having an acoustic-loss value of 40 dB/mm and a melting point of 63° C.; 5 percent by weight of the UV absorber 2-dodecyl-N-(2,2,6,6-tetramethyl-4-piperidinyl) succinimide, (Aldrich #41,317-8); 5 percent by weight of the antioxidant tetrasodium-N-(1,2-dicarboxyethyl)-N-octadecyl sulfosuccinamate, AEROSOL 22N, American Cyanamid Corporation; and 5 percent by weight of the colorant Sudan Yellow 146 [C.I. #12700] (BASF). The mixture was heated to a temperature of about 100° C. and stirred for a period of about 60 minutes until it formed a homogeneous solution, and subsequently the solution was cooled to 25° C. The resulting yellow ink had an acoustic loss value of 38 dB/mm and a viscosity of 5.05 cps at 150° C.

EXAMPLE IV

A red phase-change ink composition was prepared by mixing 65 percent by weight of the solid additive cyanomethyl-N,N-dimethyl dithiocarbamate, (Aldrich #28,054-2) having a melting point of 75° C. and an acoustic-loss value of 37 dB/mm; 20 percent by weight of 3,6-dithia-1,8-octanediol, (Aldrich #23,533-4) having an acoustic-loss value of 35 dB/mm and a melting point of 64° C.; 6 percent by weight of the UV absorber 2-dodecyl-N-(2,2,6,6-tetramethyl-4-piperidinyl) succinimide, (Aldrich #41,317-8), 4 percent by weight of the antioxidant tetra sodium-N-(1,2-dicarboxyethyl)-N-octadecyl sulfosuccinamate, AEROSOL 22N, American Cyanamid Corporation; and 5 percent by weight of the colorant Sudan Red 462 [C.I. #26050] (BASF). The mixture resulting was heated to a temperature of about 120° C. and stirred for a period of about 60 minutes until it formed a homogeneous solution, and subsequently the solution was cooled to 25° C. The resulting red ink had an acoustic loss value of 38 dB/mm and a viscosity of 5.02 cps at 150° C.

Each of the above four inks was incorporated into an acoustic ink jet printer, as disclosed in U.S. Pat. No. 4,745,419, the disclosure of which is totally incorporated herein by reference, equipped with a carrier for transporting a generally uniformly thick film of hot melt ink across its printhead, together with a heating means for liquefying the ink as it nears the printhead. The droplet ejectors were acoustically coupled to the ink via the carrier, and their output focal plane is essentially coplanar with the free surface of the liquefied ink, thereby enabling them to eject individual droplets of ink therefrom on command. The ink was moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating. A jetting frequency of 160 MHz was used to generate drops of about 2 picoliters, up to 12 drops per pixel at 600 spi. The images formed on paper exhibited excellent color quality with optical density values of 2.20 (Black) [C.I. #12195], 1.85 (Cyan) [C.I. #61554], 1.95 (Magenta) [C.I. #26050], 1.44 (Yellow) [C.I. #12700], sharp edges, with lightfast values of Black (98.5 percent), Cyan (99 percent), Magenta (96 percent), Yellow (99 percent), waterfast values of black (98.5 percent), cyan (99. percent), magenta (99 percent), yellow (100 percent). The crease values of the black, cyan, magenta and yellow ink images were measured at black (19), cyan (18), magenta (16), yellow (18). The images formed on uncoated MYLAR™ exhibited excellent color quality with optical density values of 1.58 (black), 1.53 (cyan), 1.40 (magenta), 0.95 (yellow), sharp edges. The haze values of black, cyan, magenta and yellow ink images were measured at black (21), cyan (22), magenta (12), yellow (23). The gloss values of the images were measured at 83 for all inks. The ink spherulite radius was measured as being between 2 to 4 micrometers resulting in ink haze values of between 10 to 25 when printed on transparencies.

EXAMPLE V

A black phase-change ink composition was prepared by mixing 65 percent by weight of the solid additive ethyidiphenyl carbamate, (Aldrich #37,291-9) having a melting point of 71° C. and an acoustic-loss value of 36 dB/mm; 20 percent by weight of the gloss and crease improving alcohol compound benzhydrol, (Aldrich #B,485-4) having an acoustic-loss value of 37 dB/mm and a melting point of 66° C.; 5 percent by weight of the UV absorber [1,2,2,6,6-pentamethyl-4-piperidinyl/β,β,β',β'-tetramethyl-3,9-(2,4,8,10-tetraoxo spiro (5,5) undecane)diethyl]-1,2,3,4-butane tetracarboxylate, Mixxim HALS 63, Fairmount Corporation; 5 percent by weight of the antioxidant tetra sodium-N-(1,2-dicarboxyethyl)-N-octadecyl sulfosuccinamate, AEROSOL 22N, American Cyanamid Corporation; and 5 percent by weight of the colorant Neozapon Black X51 [C.I. #12195] (BASF). The mixture resulting was heated to a temperature of about 120° C. and stirred for a period of about 60 minutes until it formed a homogeneous solution, and subsequently the solution was cooled to 25° C. The resulting black ink had an acoustic loss value of 39 dB/mm and a viscosity of 5.15 cps at 150° C.

EXAMPLE VI

A blue phase-change ink composition was prepared by mixing 65 percent by weight of the solid additive 1-allyl-3-(2-hydroxyethyl)-2-thiourea, (Aldrich #A3,280-2) having a melting point of 78(C and an acoustic-loss value of 36 dB/mm; 20 percent by weight of the alcohol compound 1-eicosanol, (Aldrich #23,449-4) having an acoustic-loss value of 39 dB/mm and a melting point of 65° C.; 5 percent by weight of the UV absorber 2-dodecyl-N(2,2,6,6-tetra methyl-4-piperidinyl) succinimide, (Aldrich #41,317-8); 5 percent by weight of the antioxidant tetra sodium-N-(1,2-dicarboxyethyl)-N-octadecyl sulfosuccinamate, AEROSOL 22N, American Cyanamid Corporation; and 5 percent by weight of the colorant Sudan Blue 670 [C.I. #61554] (BASF). The mixture resulting was heated to a temperature of about 120° C. and stirred for a period of about 60 minutes until it formed a homogeneous solution, and subsequently the solution was cooled to 25° C. The resulting blue ink had an acoustic loss value of 39 dB/mm and a viscosity of 5.35 cps at 150° C.

EXAMPLE VII

A yellow phase-change ink composition was prepared by mixing 65 percent by weight of the solid additive 1,1,3,3-tetramethyl-2-thiourea, (Aldrich #11,516-9) having a melting point of 76° C. and an acoustic-loss value of 35 dB/mm; 20 percent by weight of the alcohol compound 2,2-diethyl-1,3-propanediol, (Aldrich #D10,000-5); having an acoustic-loss value of 36 dB/mm and a melting point of 46° C.; 5 percent by weight of the UV absorber 2-dodecyl-N-(2,2,6,6-tetra methyl-4-piperidinyl) succinimide, (Aldrich #41,317-8); 5 percent by weight of the antioxidant tetrasodium-N-(1,2-dicarboxyethyl)-N-octadecyl sulfosuccinamate, AEROSOL 22N, American Cyanamid Corporation; and 5 percent by weight of the colorant Sudan Yellow 146 [C.I. #12700] (BASF). The mixture resulting was heated to a temperature of about 120° C. and stirred for a period of about 60 minutes until it formed a homogeneous solution, and subsequently was cooled to 25° C. The resulting yellow ink had an acoustic loss value of 38 dB/mm and a viscosity of 5.45 cps at 150° C.

EXAMPLE VIII

A red phase-change ink composition was prepared by mixing 65 percent by weight of the solid additive tert-butyl carbamate, (Aldrich #16,739-8) having a melting point of 106° C. and an acoustic-loss value of 40 dB/mm; 20 percent by weight of the alcohol compound dicyclohexylmethanol, (Aldrich #31,772-1) having an acoustic-loss value of 33 dB/mm and a melting point of 62° C.; 5 percent by weight of the UV absorber 2-dodecyl-N-(2,2,6,6-tetramethyl-4-piperidinyl) succinimide, (Aldrich #41,317-8); 5 percent by weight of the antioxidant tetrasodium-N-(1,2-dicarboxyethyl)-N-octadecyl sulfosuccinamate, AEROSOL 22N, American Cyanamid Corporation; and 5 percent by weight of the colorant Sudan Red 462 [C.I. #26050] (BASF). The mixture was heated to a temperature of about 120° C. and stirred for a period of about 60 minutes until it formed a homogeneous solution, and subsequently the solution was cooled to 25° C. The resulting red ink had an acoustic loss value of 38 dB/mm and a viscosity of 5.12 cps at 150° C.

Each of the above four inks was incorporated into an acoustic ink jet printer, as disclosed in U.S. Pat. No. 4,745,419, equipped with a carrier for transporting a generally uniformly thick film of hot melt ink across its printhead, together with a heating means for liquefying the ink as it nears the printhead. The droplet ejectors are acoustically coupled to the ink via the carrier, and their output focal plane is essentially coplanar with the free surface of the liquefied ink, thereby enabling them to eject individual droplets of ink therefrom on command. The ink was moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating. A jetting frequency of 160 MHz was used to generate drops of about 2 picoliters, up to 12 drops per pixel at 600 spi. The images formed on paper exhibited excellent color quality with optical density values of 2.16 (Black) [C.I. #12195], 1.82 (Cyan) [C.I. #61554], 1.98 (Magenta) [C.I. #26050], 1.37 (Yellow) [C.I. #12700], sharp edges, lightfast values of black (98.5 percent), cyan (99 percent), magenta (96 percent), yellow (99 percent), waterfast values of black (100 percent), cyan (99 percent), magenta (99.5 percent), yellow (100 percent). The crease values of black, cyan, magenta and yellow ink images were measured at black (17), cyan (19), magenta (16), yellow (12). The images formed on uncoated MYLAR® exhibited excellent color quality with transmitted optical density values of 1.66 (black), 1.55 (cyan), 1.46 (magenta), 0.92 (yellow), sharp edges. The haze values of images were measured at black (22), cyan (21), magenta (15), yellow (24). The gloss values of the images were measured at 85 for all inks. The ink spherulite radius was measured between 2 to 4 micrometer leading to ink haze values of between 10 to 25 when printed on transparencies.

The inks of the prior art U.S. Pat. No. 5,667,568, based on blends of N'-dodecylbis-stearamide, 95 percent by weight and a colorant 5 percent by weight, and inks of the prior art U.S. Pat. No. 5,698,128, derived from blends of the reaction product of an anhydride and an organoamine, 95 percent by weight and a colorant 5 percent by weight have generally viscosities in the range of about 15 to about 20 centipoise compared to preferred viscosities of about 5 to 6 centipoise for the inks of the present invention. An advantage of the lower viscosity inks resides in, for example, reduced power consumption by about 35 percent thereby increased printing speeds from about 25 pages per minute to about 40 pages per minute, improved jettability leading to better ink directionality and consequently lower edge raggedness of the prints such as a value of 5 microns and preferably lower than 3 microns. The edge raggedness refers to the deviation of the average width of a line measured from the middle of the line to the edge of the line [also known as mid-frequency line-edge noise (MFLN)] and can be measured with an optical microscope.

Other modifications of the present invention may occur to those of ordinary skill in the art subsequent to a review of the present application, and these modifications, including equivalents thereof, are intended to be included within the scope of the present invention.

What is claimed is:

1. An ink composition comprised of (1) a carbamate compound; (2) an alcohol compound with a melting point of from about 25° C. to about 95° C.; (3) a lightfastness component; (4) a lighffastness antioxidant; and (5) a colorant, and which ink is substantially free of water.

2. An ink in accordance with claim 1 wherein and wherein said carbamate compound possesses an acoustic-loss value of from about 25 to about 80 dB/mm, and (2) said alcohol compound possesses an acoustic-loss value of from about 5 to about 40 dB/mm.

3. An ink in accordance with claim 1 and which ink generates images with crease values of from about 10 to about 20, haze values of from about 10 to about 25, gloss values of from about 80 to about 85, and which ink possesses an acoustic-loss value of from about 10 to about 80 dB/mm, and a viscosity of from about 1 centipoise to about 10 centipoise at a temperature of from about 125° C. to about 165° C.

4. An ink composition in accordance with claim 1 wherein the carbamate is present in an amount of from about 1 to about 98 percent by weight, the alcohol is present in an amount of from about 69 to about 1 percent by weight, the lightfastness component is present in an amount of from about 5 to about 0.25 percent by weight, the antioxidant is present in an amount of from about 5 to about 0.25 percent by weight, and the colorant is present in an amount of from about 20 to about 0.5 percent by weight, and wherein the total of all ink components is about 100 percent.

5. An ink composition comprised of (1) a carbamate compound; (2) an alcohol compound with a melting point of from about 25° C. to about 95° C.; (3) a lightfastness component; (4) a lightfastness antioxidant; and (5) a colorant, and wherein the carbamate compound which possesses a melting point of from about 60° C. to about 120° C. is present in an amount of from about 1 to about 98 percent by weight is selected from the group consisting of (1) tert-butyl carbamate; (2) tert-butyl-N-(tert-butoxycarbonyloxy) carbamate; (3) tert-butyl-N-[2-hydroxy-2-(hydroxyphenyl)-1-methyl] carbamate; (4) tert-butyl-(2,4-dinitrophenoxy) carbamate; (5) benzyl carbamate; (6) benzyl N-hydroxycarbamate; (7) ethyldiphenyl carbamate; (8) 2-chloroethyl carbamate; (9) cyanomethyl-N,N-dimethyl dithiocarbamate; (10) 4,4'-methylene-bis(dibutyidithio carbamate); (11) potassium N-hydroxy methyl-N-methyl-dithiocarbamate; (12) sodium dimethyl dithiocarbamate; (13) disodium ethylenebis-dithio carbamate; (14) diethylammonium diethyldithio carbamate; (15) benzyl(S)-(–)-tetrahydro-5-oxo-3-furanyl carbamate; (16) diethyidithiocarbamic acid, ammonium salt; (17) diethyldithiocarbamic acid, diethyl ammonium salt; (18) diethyldithiocarbamic acid, sodium salt, trihydrate; and (19) 4-bromo-3,5-dimethylphenyl N-methylcarbamate.

6. An ink composition comprised of (1) a carbamate compound; (2) an alcohol compound with a melting point of from about 25° C. to about 95° C.; (3) a lightfastness component; (4) a lightfastness antioxidant; and (5) a colorant, and wherein the carbamate is selected from the group consisting of (1) tert-butyl carbamate; (2) tert-butyl-(2,4-dinitrophenoxy) carbamate; (3) benzyl carbamate; (4) benzyl N-hydroxycarbamate; and (5) benzyl (S)-(–)-tetrahydro-5-oxo-3-furanyl carbamate.

7. An ink composition comprised of (1) a carbamate compound; (2) an alcohol compound with a melting point of from about 25° C. to about 95° C.; (3) a lightfastness component; (4) a lightfastness antioxidant; and (5) a colorant, and wherein alcohol is a cyclic alcohol selected from the group consisting of (1) cycloalkyl alcohols; (2) 4-tert-butyl cyclohexanol; (3) 3-aminomethyl-3,5,5-trimethyl cyclohexanol; (4) 2,2,6,6-tetrachloro cyclohexanol; (5) cycloalkane methanol; (6) dicyclohexylmethanol; (7) 3-cyclohexyl-1-propanol; (8) 2-amino-3-cyclohexyl-1-propanol; (9) (S)-2-(tert-butoxy carbonylamino)-3-cyclohexyl-1-propanol; (10) cycloalkane diol; (11) cis-3,5-cyclohexa diene-1,2-diol; (12) ρ-menthane-3,8-diol; (13) cyclohexane dimethanol; (14) 3-cyclohexene-1,1-dimethanol; (15) 1,3-dioxane-5,5-dimethanol; and (16) piperidinemethanol.

8. An ink composition in accordance with claim 1 wherein the alcohol is a linear alcohol selected from the group consisting of (1) alkyl alcohols, where the number of carbons in the alkyl chain vary from about 6 to about 22; and (2) alkane diols where the number of carbons in the alkane chain vary from about 5 to about 14.

9. An ink composition in accordance with claim 1 wherein the alcohol is (3) di(trimethylol propane); (4) nitromethane trispropanol; (5) 11-bromo-1-undecanol; (6) 12-bromo-1-dodecanol; (7) 2-methyl-2-propyl-1,3-propane diol; (8) 2,2-diethyl-1,3-propanediol; (9) (2-(hydroxymethyl)-1,3-propanediol; (10) 2,2,4-trimethyl-1,3-pentanediol; (11) 2-butyne-1,4-diol; (12) (±)-3,6-dimethyl-4-octyne-3,6-diol; (13) 3,6-dithia-1,8-octanediol; or (14) 2,4,7,9-tetramethyl-5-decyne-4,7-diol.

10. An ink composition comprised of (1) a carbamate compound; (2) an alcohol compound with a melting point of from about 25° C. to about 95° C.; (3) a lightfastness component; (4) a lightfastness antioxidant; and (5) a colorant, and wherein the alcohol is amino alcohol selected from the group consisting of (1) 2-(2-aminoethoxy)ethanol; (2) 2-(2-amino ethylamino) ethanol; (3) amino-1-propanol; (4) 2-amino-1-butanol; (5) 4-amino-1-butanol; (6) 2-amino-3-methyl-1-butanol; (7) 5-amino-1-pentanol; (8) 6-amino-1-hexanol; (9) DL-2-amino-1-hexanol; and (10) (S)-(−)-N-(tert-butoxycarbonyl) leucinol; or an aromatic alcohol.

11. An ink composition comprised of (1) a carbamate compound; (2) an alcohol compound with a melting point of from about 25° C. to about 95° C.; (3) a lightfastness component; (4) a lightfastness antioxidant; and (5) a colorant, and wherein the alcohol is selected from the group consisting of benzyl alcohol; (1) alkyl benzyl alcohols where the number of carbon atoms in the alkyl group vary from 0 to about 8; (2) alkoxy and aryloxy benzyl alcohols where the number of carbons in the alkoxy groups vary from about 1 to about 4; (3) alkyl alkyl benzyl alcohols where the number of carbons in the alkyl varies from about 1 to about 4; (4) 2-amino-3-methyl benzyl alcohol; (5) alkoxy alkoxy benzyl alcohols where the number of carbon atoms in the alkoxy group varies from about 1 to about 4; (6) 2-hydroxy-3-methoxy benzyl alcohol; and (7) 3,4,5-trimethoxy benzyl alcohol.

12. An ink composition comprised of (1) a carbamate compound; (2) an alcohol compound with a melting point of from about 25° C. to about 95° C.; (3) a lightfastness component; (4) a lightfastness antioxidant; and (5) a colorant, and wherein the alcohol is selected from the group consisting of phenyl alcohol; (1) phenylpropanol; (2) 3-(4-hydroxy phenyl)-1-propanol; (3) (S)-(−)-1-phenyl-1-butanol; (4) 2-amino-1-phenyl ethanol; (5) 3,4-dimethoxy phenethyl alcohol; (6) 2-phenyl-1,2-propane diol; (7) 3-phenoxy-1,2-propane diol; (8) 3-methoxy catechol; (9) benzhydrol; (10) methyl benzhydrol; (11) phenethylalcohol; (12) 4-methoxy phenethyl alcohol; (13) 2-hydroxy phenethyl alcohol; and (14) 2-amino phenethylalcohol.

13. An ink in accordance with claim 1 wherein the lightfastness component is a compound selected from the group consisting of (1) 1,1-(1,2-ethane diyl) bis(3,3,5,5-tetramethyl piperazinone); (2) 6-ethoxy-1,2-dihydro-2,2,4-trimethyl quinoline; (3) 2-(4-benzoyl-3-hydroxyphenoxy) ethyl acrylate; (4) 2-dodecyl-N-(2,2,6,6-tetramethyl-4-piperidinyl)succinimide; and (5) 1,2,2,6,6-pentamethyl-4-piperidinyl/β,β,β',β'-tetramethyl-3,9-(2,4,8,10-tetraoxo spiro (5,5) undecane)diethyl]-1,2,3,4-butane tetracarboxylate.

14. An ink in accordance with claim 1 wherein the lightfastness antioxidant compound is selected from the group consisting of (1) antimony dialkyl phosphorodithioate; (2) molybdenum oxysulfide dithio carbamate; (3) nickel-bis(o-ethyl) (3,5-di-tert-butyl-4-hydroxybenzyl) phosphonate; and (4) tetra sodium N-(1,2-dicarboxyethyl)-N-octadecyl sulfosuccinamate.

15. A printing process which comprises incorporating into an acoustic ink jet printer an ink comprised of (1) a carbamate compound; (2) an alcohol compound with a melting point of from about 25° C. to about 95° C.; (3) a lightfastness component; (4) a lightfastness antioxidant; and (5) a colorant.

16. A process in accordance with claim 15 wherein said ink generates images with crease values of between about 10 to about 20, haze values of between about 10 to about 25, gloss values between about 80 to about 85, and which ink possesses an acoustic-loss value of from about 10 to about 80 dB/mm, and a viscosity of from about 1 centipoise to about 10 centipoise at a temperature of from about 125° C. to about 165° C.

17. A process which comprises providing an acoustic ink printer having a pool of the liquid ink comprised of (1) a carbamate compound; (2) an alcohol compound with a melting point of from about 25° C. to about 95° C.; (3) a lightfastness component; (4) a lightfastness antioxidant; and (5) a colorant with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

18. A process in accordance with claim 17 wherein said ink generates images with crease values of between about 10 to 25, haze values of between about 10 to about 30, gloss values between about 80 about 95, and which ink possesses an acoustic-loss value of from about 10 to about 80 dB/mm, and a viscosity of from about 1 centipoise to about 15 centipoise at a temperature of from about 125° C. to about 165° C.

19. An ink in accordance with claim 1 wherein the colorant is selected in an amount of from about 0.5 to about 20 percent by weight.

20. An ink in accordance with claim 1 wherein the colorant is a pigment, or a dye.

21. An ink in accordance with claim 1 wherein the colorant is a pigment of cyan, magenta, yellow, black, or mixtures thereof.

22. An ink composition comprised of (1) a carbamate compound; (2) an alcohol compound with a melting point of from about 25° C. to about 95° C.; (3) a lightfastness component; (4) a lightfastness antioxidant; and (5) a colorant, and wherein the carbamate is (1) benzyl (S)-(−)-tetrahydro-5-oxo-3-furanyl carbamate; (3) the lightfastness component is a UV absorber is 2-dodecyl-N-(2,2,6,6-tetramethyl-4-piperidinyl) succinimide, [1,2,2,6,6-pentamethyl-4-piperidinyl/β,β,β',β'-tetramethyl-3,9-(2,4,8,10-tetraoxo spiro (5,5) undecane) diethyl]-1,2,3,4-butane tetracarboxylate and (4) the lightfastness antioxidant is tetra-sodium-N-(1,2-dicarboxyethyl)-N-octadecyl-sulfosuccinamate), molybdenum oxysulfide dithio carbamate.

23. An ink in accordance with claim 1 with a viscosity of from about 1 centipoise to about 10 centipoise and an acoustic loss of from about 10 to about 80 dB/mm.

24. An ink composition comprised of (1) a carbamate; (2) an alcohol; (3) a lightfastness compound; (4) an antioxidant; and (5) a colorant, and wherein said carbamate possesses a melting point of from about 60° C. to about 120° C.

25. An ink composition in accordance with claim 24 and wherein said carbamate possesses an acoustic-loss value of from about 25 to about 80 dB/mm; (2) said alcohol possesses a melting point of from about 25° C. to about 90° C. with an acoustic-loss value of from about 5 to about 40 dB/mm, and which ink possesses an acoustic-loss value of from about 10 to about 80 dB/mm, and a viscosity of from about 1 centipoise to about 20 centipoise at a temperature of from about 125° C. to about 165° C.

26. An ink in accordance with claim 24 wherein the colorant is a pigment, or a dye.

27. An ink comprised of (1) a carbamate compound; (2) an alcohol compound with a melting point of from about 25° C. to about 95° C.; (3) a lightfastness component; (4) a lightfastness antioxidant; and (5) a colorant, and which ink contains no water.

28. An ink in accordance with claim 27 wherein said carbamate compound possesses a melting point of from about 60° C. to about 120° C. and is present in an amount of from about 1 to about 98 percent by weight and is selected from the group consisting of (1) tert-butyl carbamate; (2) tert-butyl-N-(tert-butoxycarbonyloxy) carbamate; (3) tert-butyl-N-[2-hydroxy-2-(hydroxyphenyl)-1-methylethyl] carbamate; (4) tert-butyl-(2,4-dinitrophenoxy) carbamate; (5) benzyl carbamate; (6) benzyl N-hydroxycarbamate; (7) ethyldiphenyl carbamate; (8) 2-chloroethyl carbamate; (9) cyanomethyl-N,N-dimethyl dithiocarbamate; (10) 4,4'-methylene-bis(dibutyidithio carbamate); (11) potassium N-hydroxy methyl-N-methyl-dithiocarbamate; (12) sodium dimethyl dithiocarbamate; (13) disodium ethylenebis-dithio carbamate; (14) diethylammonium diethyidithio carbamate; (15) benzyl(S)-(−)-tetrahydro-5-oxo-3-furanyl carbamate; (16) diethyidithiocarbamic acid, ammonium salt; (17) diethyldithiocarbamic acid, diethyl ammonium salt; (18) diethyldithiocarbamic acid, sodium salt, trihydrate; and (19) 4-bromo-3,5-dimethylphenyl N-methylcarbamate.

29. An ink in accordance with claim 27 wherein said carbamate compound possesses a melting point of from about 60° C. to about 120° C. and is present in an amount of from about 1 to about 98 percent by weight and is selected from the group consisting of (1) tert-butyl carbamate; (2) tert-butyl-(2,4-dinitrophenoxy) carbamate; (3) benzyl carbamate; (4) benzyl N-hydroxycarbamate; and (5) benzyl (S)-(−)-tetrahydro-5-oxo-3-furanyl carbamate.

30. An ink in accordance with claim 27 wherein said alcohol is selected from the group consisting of (1) cycloalkyl alcohols; (2) 4-tert-butyl cyclohexanol; (3) 3-aminomethyl-3,5,5-trimethyl cyclohexanol; (4) 2,2,6,6-tetrachloro cyclohexanol; (5) cycloalkane methanol; (6) dicyclohexylmethanol; (7) 3-cyclohexyl-1-propanol; (8) 2-amino-3-cyclohexyl-1-propanol; (9) (S)-2(tert-butoxy carbonylamino)-3-cyclohexyl-1-propanol; (10) cycloalkane diol; (11) cis-3,5-cyclohexa diene-1,2-diol; (12) ρ-menthane-3,8-diol; (13) cyclohexane dimethanol; (14) 3-cyclohexene-1,1-dimethanol; (15) 1,3-dioxane-5,5-dimethanol; and (16) piperidinemethanol.

31. An ink in accordance with claim 27 wherein said alcohol is selected from the group consisting of (3) di(trimethylol propane); (4) nitromethane trispropanol; (5) 11-bromo-1-undecanol; (6) 12-bromo-1-dodecanol; (7) 2-methyl-2-propyl-1,3-propane diol; (8) 2,2-diethyl-1,3-propanediol; (9) (2-(hydroxymethyl)-1,3-propanediol; (10) 2,2,4-trimethyl-1,3-pentanediol; (11) 2-butyne-1,4-diol; (12) (±)-3,6-dimethyl-4-octyne-3,6-diol; (13) 3,6-dithia-1,8-octanediol; or (14) 2,4,7,9-tetramethyl-5-decyne-4,7-diol.

32. An ink in accordance with claim 27 wherein said lightfastness component is selected from the group consisting of (1) 1,1-(1,2-ethane diyl) bis(3,3,5,5-tetramethyl piperazinone); (2) 6-ethoxy-1,2-dihydro-2,2,4-trimethyl quinoline; (3) 2-(4-benzoyl-3-hydroxyphenoxy)ethyl acrylate; (4) 2-dodecyl-N-(2,2,6,6-tetramethyl-4-piperidinyl) succinimide; and (5) 1,2,2,6,6-pentamethyl-4-piperidinyl/β, β,β',β'-tetramethyl-3,9-(2,4,8,10-tetraoxo spiro (5,5) undecane)diethyl]-1,2,3,4-butane tetracarboxylate.

33. An ink in accordance with claim 27 lightfastness antioxidant compound is selected from the group consisting of (1) antimony dialkyl phosphorodithioate; (2) molybdenum oxysulfide dithio carbamate; (3) nickel-bis(o-ethyl) (3,5-di-tert-butyl-4-hydroxybenzyl)phosphonate; and (4) tetra sodium N-(1,2-dicarboxyethyl)-N-octadecyl sulfosuccinamate.

* * * * *